(12) United States Patent
Su et al.

(10) Patent No.: US 7,206,990 B2
(45) Date of Patent: Apr. 17, 2007

(54) DATA SECTOR ERROR HANDLING MECHANISM

(75) Inventors: Hui Su, Longmont, CO (US); Gregory P. Moller, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 662 days.

(21) Appl. No.: 10/379,295

(22) Filed: Mar. 3, 2003

(65) Prior Publication Data

US 2003/0177434 A1 Sep. 18, 2003

Related U.S. Application Data

(63) Continuation-in-part of application No. 10/071,018, filed on Feb. 7, 2002.

(60) Provisional application No. 60/361,548, filed on Mar. 4, 2002, provisional application No. 60/325,339, filed on Sep. 27, 2001.

(51) Int. Cl.
*G11C 29/00* (2006.01)

(52) U.S. Cl. .................................. 714/769 G

(58) Field of Classification Search ........ 714/763–765, 714/769
See application file for complete search history.

(56) References Cited

U.S. PATENT DOCUMENTS

| | | | |
|---|---|---|---|
| 4,138,719 A | 2/1979 | Swanstrom et al. | 364/200 |
| 4,194,685 A | 3/1980 | Hill et al. | 235/375 |
| 4,321,700 A | 3/1982 | Russell | 369/44 |
| 4,429,217 A | 1/1984 | Hill et al. | 235/380 |
| 4,438,463 A | 3/1984 | Sakamoto | 360/10.2 |
| 4,445,189 A | 4/1984 | Hyatt | 364/600 |
| 4,886,958 A | 12/1989 | Merryman et al. | 250/201 |
| 4,912,487 A | 3/1990 | Porter et al. | 346/108 |
| 5,012,073 A | 4/1991 | Hewitt et al. | 235/375 |
| 5,095,447 A | 3/1992 | Manns et al. | 382/144 |
| 5,220,569 A | 6/1993 | Hartness | |
| 5,359,468 A | 10/1994 | Rhodes et al. | 360/48 |
| 5,386,405 A | 1/1995 | Fujiwara et al. | 369/59 |
| 5,438,462 A | 8/1995 | Copolillo | 360/53 |
| 5,602,857 A | 2/1997 | Zook et al. | |
| 5,629,949 A | 5/1997 | Zook | |
| 5,661,848 A | 8/1997 | Bonke et al. | 711/112 |
| 5,682,272 A | 10/1997 | Taroda et al. | 360/53 |
| 5,699,342 A | 12/1997 | Yagi et al. | 369/116 |
| 5,701,304 A * | 12/1997 | Glover et al. | 714/710 |
| 5,740,267 A | 4/1998 | Echerer et al. | 382/132 |
| 5,748,578 A | 5/1998 | Schell | 369/44.14 |
| 5,774,357 A | 6/1998 | Hoffberg et al. | 364/188 |
| 5,808,825 A | 9/1998 | Okamura | 360/75 |
| 5,844,919 A | 12/1998 | Glover et al. | 714/769 |

(Continued)

OTHER PUBLICATIONS

U.S. Appl. No. 09/897,802, filed Jun. 29, 2001, Swee Kieong Choo.

*Primary Examiner*—Shelly Chase
(74) *Attorney, Agent, or Firm*—Todd R. Froneck Westman, Champlin & Kelly P.A.

(57) ABSTRACT

A method is provided for handling errors in a data storage system. The method includes determining a number of sectors to be accessed. Also, all sectors from the number of sectors are accessed during a first access routine. Next, error sectors are identified and the error sectors are accessed during a second access routine.

24 Claims, 9 Drawing Sheets

U.S. PATENT DOCUMENTS

| | | | |
|---|---|---|---|
| 5,850,304 A | 12/1998 | Elmers et al. | 369/142 |
| 5,909,334 A | 6/1999 | Barr et al. | 360/53 |
| 5,966,121 A | 10/1999 | Hubbell et al. | 345/328 |
| 6,009,549 A * | 12/1999 | Bliss et al. | 714/769 |
| 6,092,231 A | 7/2000 | Sze | 714/758 |
| 6,122,235 A | 9/2000 | Arai | 369/54 |
| 6,178,054 B1 | 1/2001 | Wakefield | 360/31 |
| 6,181,493 B1 | 1/2001 | Wakefield | 360/31 |
| 6,192,499 B1 | 2/2001 | Yang | 714/785 |
| 6,230,311 B1 | 5/2001 | Gerard et al. | 717/2 |
| 6,247,152 B1 * | 6/2001 | Russell | 714/718 |
| 6,384,997 B1 * | 5/2002 | Wu et al. | 360/46 |
| 6,421,197 B1 | 7/2002 | Abdelnour | 360/77.02 |
| 6,426,928 B1 * | 7/2002 | Russell | 369/53.15 |
| 6,442,705 B1 | 8/2002 | Lamberts | 714/2 |
| 6,862,151 B2 * | 3/2005 | Hoskins et al. | 360/53 |

* cited by examiner

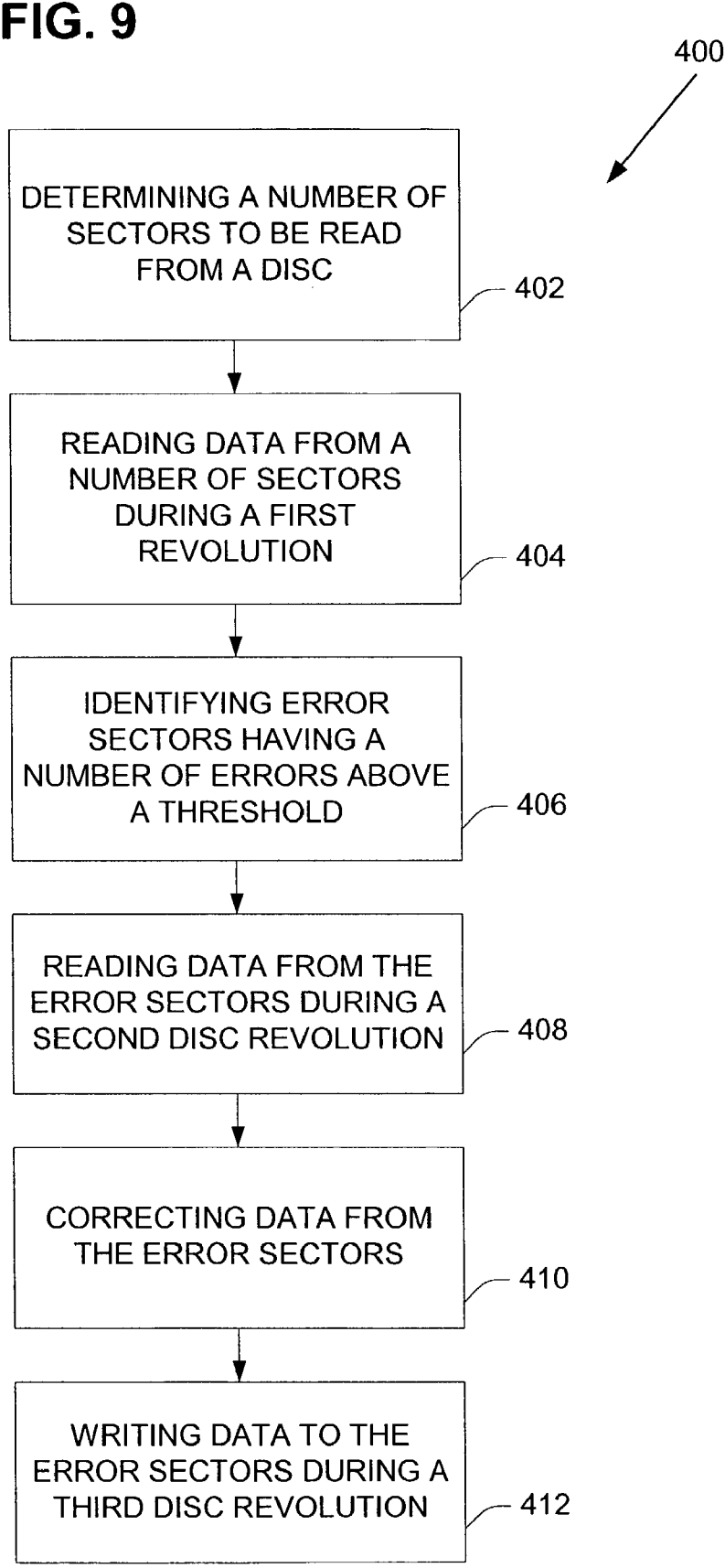

DATA SECTOR ERROR HANDLING MECHANISM

CROSS-REFERENCE TO RELATED APPLICATION

This application claims benefit of U.S. Provisional Application 60/361,548 filed on Mar. 4, 2002, for inventors Hui Su and Gregory P. Moller and entitled "HARD DISC WRITE FAULT ACCUMULATION AND RECOVER MECHANISM," and is a continuation-in-part of U.S. application Ser. No. 10/071,018 filed Feb. 7, 2002 for inventors Hui Su and Gregory P. Moller and entitled "DATA SECTOR ERROR TRACKING AND CORRECTION MECHANISM", which claims the benefit of U.S. Provisional Application 60/325,339 filed on Sep. 27, 2001, for inventors Hui Su and Gregory P. Moller and entitled, "DATA SECTOR ERROR TRACKING AND CORRECTION MECHANISM."

FIELD OF THE INVENTION

The present invention relates generally to data storage systems, and more particularly but not by limitation to an error handling mechanism for data sectors.

BACKGROUND OF THE INVENTION

In a disc drive, data is stored on one or more discs. A disc is typically divided into a plurality of generally parallel disc tracks, which are arranged concentrically with one another and perpendicular to the disc radius. Each track is further broken down into a plurality of sectors, which further aid in locating information. Each sector is a data portion of a track that stores data. Typically, the disc is a magnetic recording medium that uses single-state domains and magnetic transition domains to store bits corresponding to a "1" or "0" on the disc surface. Usually, a magnetic domain contains at least 100 thermally stable grains or magnetic particles.

The data is accessed, or stored and retrieved, by a transducer or "head" that is positioned over a desired track by an actuator arm. Typically, when an operation (read or write) is sent from a host (such as a computer) to the disc drive, a controller converts a logical block address (LBA) received from the host to a physical block address (PBA). Next, the physical track, head and sector information, which includes the number of sectors to be accessed from a destination track, are calculated based on the PBA. A seek operation is then performed and sectors falling on the same track are usually accessed within one disc revolution.

To maintain data integrity and high data transfer rates, read and write elements are maintained as close as practicable over the center of each track during read and write operations. For example, even if data are properly written in a centered relationship over a selected track, attempting to subsequently read the data while the head offset from the center of the track may result in an unacceptable number of read errors, due to the inability of the read element to properly detect the written data, as well as the potential interference from the selective magnetization of an adjacent track. More significantly, writing data too far away from the track center can prevent subsequent recovery when the head is centered over the track, and can also corrupt data stored on the adjacent track.

Thus, disc drives typically utilize positioning thresholds to minimize the occurrence of read errors and data overwriting. These thresholds are usually expressed as a percentage of track width and define zones about the center of the tracks in which safe reading and writing can take place. For example, a typical read threshold might be established at +/−10% of the track width, so that read operations are enabled only while the head is positioned less than 10% of the track width away from the center of the track. Similarly, a typical write threshold might be established at +/−17%, so that write operations are enabled only while the head is positioned less than 17% away from the center of the track. During read and write operations, the servo system continually monitors the position of the respective elements and provides an error signal if the threshold is reached or exceeded. The thresholds are determined during disc drive design and are intended to balance various factors including track density, acceptable read error rates, expected variations in the sizes of the read and write elements, and acceptable data transfer rates.

Various other conditions can cause errors when writing information to a disc. These conditions include no write current, an open or shorted head, low write data frequency and low power supply. When these conditions are detected, one or more error signals are generated. For each error signal encountered, the current operation is interrupted and a retry operation is attempted. Performing a retry for each sector having an error signal results in reduced drive performance.

During a read operation, it is common to encounter disc read-errors when the disc drive transfers data from the disc to a buffer RAM inside the disc drive before data is sent to the host. Therefore, error correction techniques are typically used to correct any read errors in the data that is sent to the host. However, ever-increasing disc drive densities increase the number of errors encountered. Some errors occur momentarily due to system noise, thermal conditions or external vibrations. Small magnetic domains have a propensity to reverse their magnetic state due to these conditions. These and other errors may propagate to form large errors (growth errors) under certain conditions that can ultimately cause long correction times and unrecoverable errors.

In current systems, growth errors are prevented by correcting errors in a sector (known as an "error sector") that has more errors than a threshold level. Threshold levels below the maximum correction capability are used to prevent growth errors. When an error sector is encountered during a read operation, the controller stops the read operation and applies a retry routine that re-reads the error sector into the buffer memory. Then, the error sector is corrected and written back to the disc during the retry routine. Stopping the read operation for each error sector encountered and performing a retry routine on the error sector results in extra revolutions for the read operation, which increases overhead. Alternatively, an entire data track can be written into the data buffer and written back to the disc to reduce disc revolutions in a retry routine. However, this dramatically increases the data buffer size and causes retry routines to be time consuming and expensive since every sector has to be read into the data buffer no matter whether the data sector has errors or not. Various embodiments of the present invention address these problems, and offer other advantages over the prior art.

SUMMARY OF THE INVENTION

The present invention addresses the above-mentioned problems in a storage system.

One embodiment of the present invention is directed to a method for handling data errors in a system. The method includes determining a number of sectors to be accessed.

Also, all sectors from the number of sectors are accessed during a first access routine. Next, error sectors are identified and the error sectors are accessed during a second access routine.

Another embodiment of the present invention relates to a data storage system. The system includes a storage medium, a head configured to access data from the storage medium, a buffer memory and a controller. The controller is configured to determine a number of sectors to be accessed from the storage medium and access all sectors of the number of sectors on the storage medium during a first routine. Furthermore, the controller is configured to identify error sectors from the number of sectors and access the error sectors during a second routine.

These and various other features as well as advantages, which characterize various embodiments of the present invention, will be apparent upon reading of the following detailed description and review of the associated drawings.

BRIEF DESCRIPTION OF THE DRAWINGS

FIG. 9 is a flow chart illustrating a method of error correction according to one embodiment of the present invention.

DETAILED DESCRIPTION OF ILLUSTRATIVE EMBODIMENTS

Figure 1:
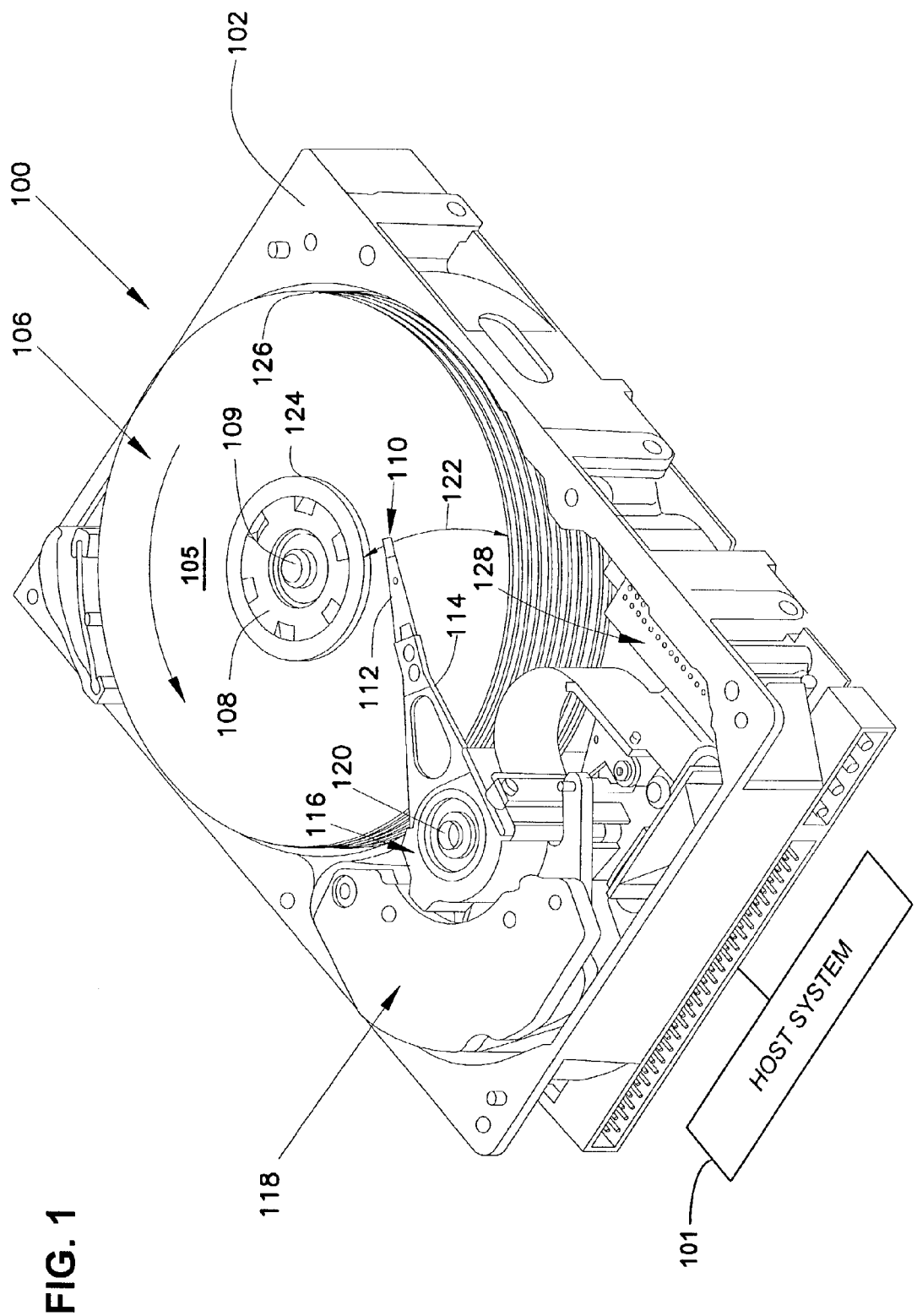
FIG. 1 is a perspective view of a disc drive with which various embodiments of the present invention are useful.

FIG. 1 illustrates a perspective view of a magnetic disc drive 100 in which various embodiments of the present invention are useful. The same reference numerals are used in the various figures to represent the same or similar elements. Host system 101 utilizes disc drive 100 for data storage. Disc drive 100 includes a housing with a base 102 and a top cover (not shown). Disc drive 100 further includes a plurality of individual discs 105 in disc pack 106, which is mounted on a spindle motor 107 (FIG. 2) by a disc clamp 108. The plurality of individual discs 105 are mounted for co-rotation about central axis 109.

Each disc surface has an associated slider 110, which is mounted in disc drive 100 and carries a read/write head for communication with the disc surface. In the example shown in FIG. 1, sliders 110 are supported by suspensions 112, which are in turn supported by track accessing arms 114 of an actuator 116. The actuator shown in FIG. 1 is of the type known as a rotary moving coil actuator and includes a voice coil motor (VCM), shown generally at 118. Other types of actuators can be used, such as linear actuators.

Voice coil motor 118 rotates actuator 116 with its attached sliders 110 about a pivot shaft 120 to position slider 110 over a desired data track along a path 122 between a disc inner diameter 124 and a disc outer diameter 126. Voice coil motor 118 operates under the control of a closed-loop servo controller within internal circuitry 128 (including a disc controller 129 in FIG. 2) based on position information, which is stored on one or more of the disc surfaces within dedicated servo fields. The servo field can be interleaved with data sectors on each disc surface or can be located on a single disc surface that is dedicated to storing servo information. As slider 110 passes over the servo fields, the read/write head generates a readback signal that identifies the location of the head relative to the center line of the desired track. Based on this location, actuator 116 moves suspension 112 to adjust the position of the head so that it moves toward the desired position. Once the transducing head is appropriately positioned, disc controller 129 can then execute a desired read or write operation.

Figure 2:
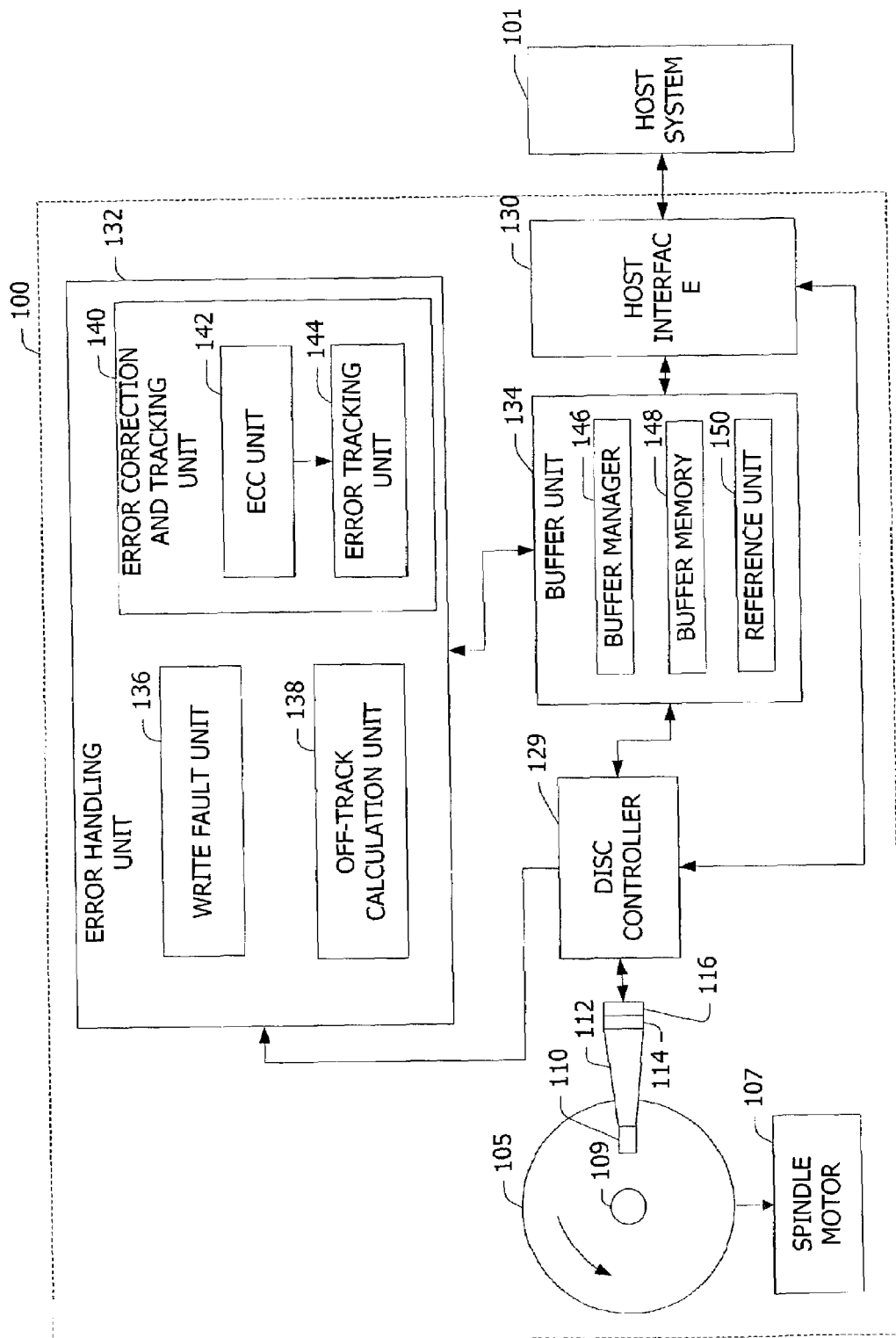
FIG. 2 a schematic diagram of a disc drive in accordance with the present invention.

FIG. 2 illustrates a schematic diagram of disc drive 100 in accordance with one embodiment of the present invention. Spindle motor 107 rotates disc 105 about central axis 109 at a high speed. Slider 110, which carries a read/write head, is supported by suspension 112. Suspension 112 is connected to track accessing arm 114 of actuator 116, herein schematically illustrated. Disc controller 129 directs the position of actuator 116 to access data from disc 105 with slider 110. Disc controller 129 is operably coupled to the read/write head of slider 110 to selectively read and write particular sectors. Host system 101 is in communication with disc controller 129 through host interface 130. Host interface 130 is adapted to receive commands from host system 101 and provide them to disc controller 129 in order to operate disc drive 100 in accordance with these commands.

When an operation (read or write) is sent from host 101 to host interface 130, host interface 130 directs disc controller 129 to perform the operation on disc 105. Disc controller 129 identifies a set (or number) of data sectors to be accessed and accesses all of the data sectors in the set on disc 105 during a first routine. If the access is a write operation, disc controller 129 provides any write fault signals as well as positioning information to error handling unit 132. During a read operation, data read from disc 105 is provided to buffer unit 134 and to error handling unit 132 to provide error correction as discussed below. Positioning information may also be provided to error handling unit 132 during a read operation. Buffer unit 134 provides temporary storage for data read from disc controller 129 and for data that is to be written to disc 105. Although herein illustrated as separate units, those skilled in the art will recognize that disc controller 129, error handling unit 132 and buffer unit 134 may be part of a single integrated circuit (IC) and also be part of internal circuitry 128.

Error handling unit 132 includes a write fault unit 136, an off-track calculation unit 138 and an error correction and tracking unit 140. During a write operation, write fault unit 136 receives write fault error signals from disc controller 129 indicative of various write fault situations as is known in the art. Write fault unit 136 analyzes these signals to identify error sectors encountered during a write operation. If a write fault is encountered while writing a sector, write fault unit 136 identifies the sector as an error sector. Information that identifies these error sectors is provided to buffer unit 134.

Off-track calculation unit 138 receives positioning information (also known as servo information) from disc controller 129 indicative of a position of a head on slider 110 relative to a particular track. The off-track calculation unit 138 can be employed during both read and write operations.

Servo information is provided on disc 105 to aid in positioning and includes magnetic patterns, or "bursts". In one embodiment, servo information is provided in a quadrature pattern having two fields extending between track centers and two fields extending between track boundaries. Relative magnitudes of readback signals from the fields are used to determine the position of the head with respect to the track. Given the magnitude of the signals, off-track calculation unit 138 determines the position of the head relative to the track. However, any type of servo pattern can be used in alternative embodiments of the present invention. If, during an operation, the position of the head is a distance from the center of the track that is further than a determined threshold, off-track calculation unit 138 will identify the sector being accessed as an error sector. Error sector information is then sent to buffer unit 134.

Error correction and tracking unit 140 includes error correction code (ECC) unit 142 and error tracking unit 144. ECC unit 142 performs error correction on data using an error correction code, typically through use of an algorithm, parity bits or other method. Any type of error correction can be used to detect and/or correct data supplied to ECC unit 142. Data supplied to ECC unit 142 is usually a number of sectors read from disc 105. While ECC unit 142 is performing error correction, error tracking unit 144 tracks the number of errors in each data sector, or alternatively monitors an error rate. The number of errors (or error rate) in each data sector is compared with a predefined limit level in error tracking unit 144. A signal is generated based on whether the number of errors (or error rate) in each data sector is more than the predefined limit level. If a sector includes more errors than the limit level, that sector is identified as an error sector.

Buffer unit 134 includes a buffer manager 146, buffer memory 148 and reference unit 150. Buffer manager 146 controls operation of buffer unit 134, including managing the data stored in buffer memory 148. Buffer memory 148 stores data that is to be written to disc 105 and data that is read from disc 105. Reference unit 150 is used to store the signals that identify the error sectors from error handling unit 132. Buffer unit 134 uses the data stored in reference unit 150 to determine which sectors are to be accessed.

When error correction and tracking unit 140 is employed during a read operation, buffer unit 134, in conjunction with buffer manager 146, stores data received from disc controller 129 into buffer memory 148. After receiving error correction and tracking data from error correction and tracking unit 140, buffer manager 146 corrects the data stored in buffer memory 148 and stores the error tracking data into reference unit 150. The corrected data from buffer memory 148 is then sent through host interface 130 to host system 101.

If error tracking unit 144 determines that there are error sectors from the number of sectors that are read, buffer unit 134 will send a command to disc controller 129 to read only the identified error sectors of the number of sectors in a next disc revolution. Buffer unit 134 uses the data in reference unit 150 to determine which sectors are to be read. Data read from the error sectors is then sent from disc controller 129 to error correction and tracking unit 140 and buffer unit 134.

ECC unit 142 corrects the error sectors and sends corrected information to buffer unit 134. Buffer unit 134, which has stored the error sectors in buffer memory 148, uses buffer manager 146 and correction data from ECC unit 142 to correct the error sectors in buffer memory 148. After the error sectors in buffer memory 148 have been corrected, buffer unit 134 sends a write operation to disc controller 129 to write the corrected data back to disc 105 using the data stored in reference unit 150.

Figure 3:
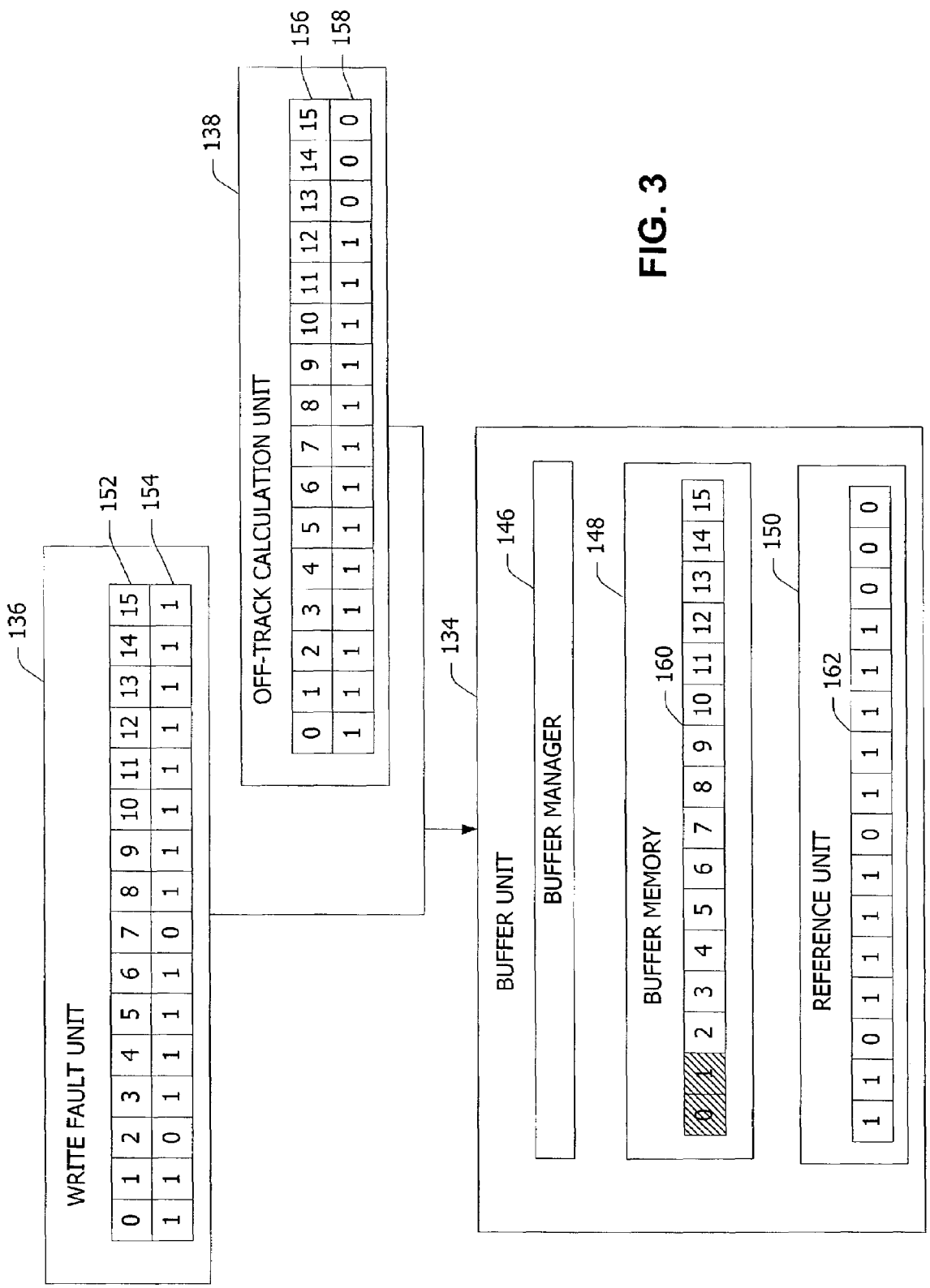
FIG. 3 is a block diagram of a write fault unit, an off-track calculation unit and a buffer unit.

FIG. 3 illustrates an exemplary embodiment for operation of write fault unit 136, off-track calculation unit 138 and buffer unit 134. In this example, buffer unit 134 has directed disc controller 129 to write data sectors 0–15 to disc 105. During the write operation, write fault unit 136 and off-track calculation unit 138 receive information regarding the write operation from disc controller 129. Write fault unit 136 includes a row of sector identifiers 152 and a row of error sector information 154. During the write operation, write fault unit 136 received error signals when disc controller 129 was writing sectors 2 and 7. The sectors 2 and 7 are therefore identified as "error sectors" by denoting these sectors with a "0" in row 154. After row 156 has been generated, the information is sent to buffer unit 134. Off-track calculation unit 138 tracks errors that occur from poor track positioning. Off-track calculation unit 138 includes a row of sector identifiers 156 and a row of error sector information 158. Sectors 13, 14 and 15 were identified as error sectors from positioning information. Therefore, error sectors 13, 14 and 15 are denoted with a "0" in row 158. Having identified the error sectors, off-track calculation unit 138 sends row 158 to buffer unit 134.

Having received error sector information from write fault unit 136 and off-track calculation unit 138, buffer unit 134 prepares to write data from error sectors 2, 7, 13, 14 and 15. In one embodiment, buffer manager 146 will discard information that is no longer needed in buffer memory 148. For example, buffer manager 146, in this example, will discard sectors 0 and 1. These sectors may be discarded since they were written correctly to disc 105 and do not serve to provide reference for other error sectors that need to be written to disc 105. As a result, buffer 148 includes data 160 from sectors 2–15 (sectors 0 and 1, shown as shaded sectors, have been discarded). Using data received from error handling unit 132, reference unit 150 generates a composite "skip mask" 162 that contains logic signals or flags indicating whether particular sectors are error sectors or not. In this example, skip mask 162 includes error sector flags for sectors 2, 7, 13, 14 and 15. Buffer unit 134 can then send data 160 and skip mask 162 to disc controller 129 in order to rewrite only the error sectors identified by skip mask 162 to disc 105.

Figure 4:
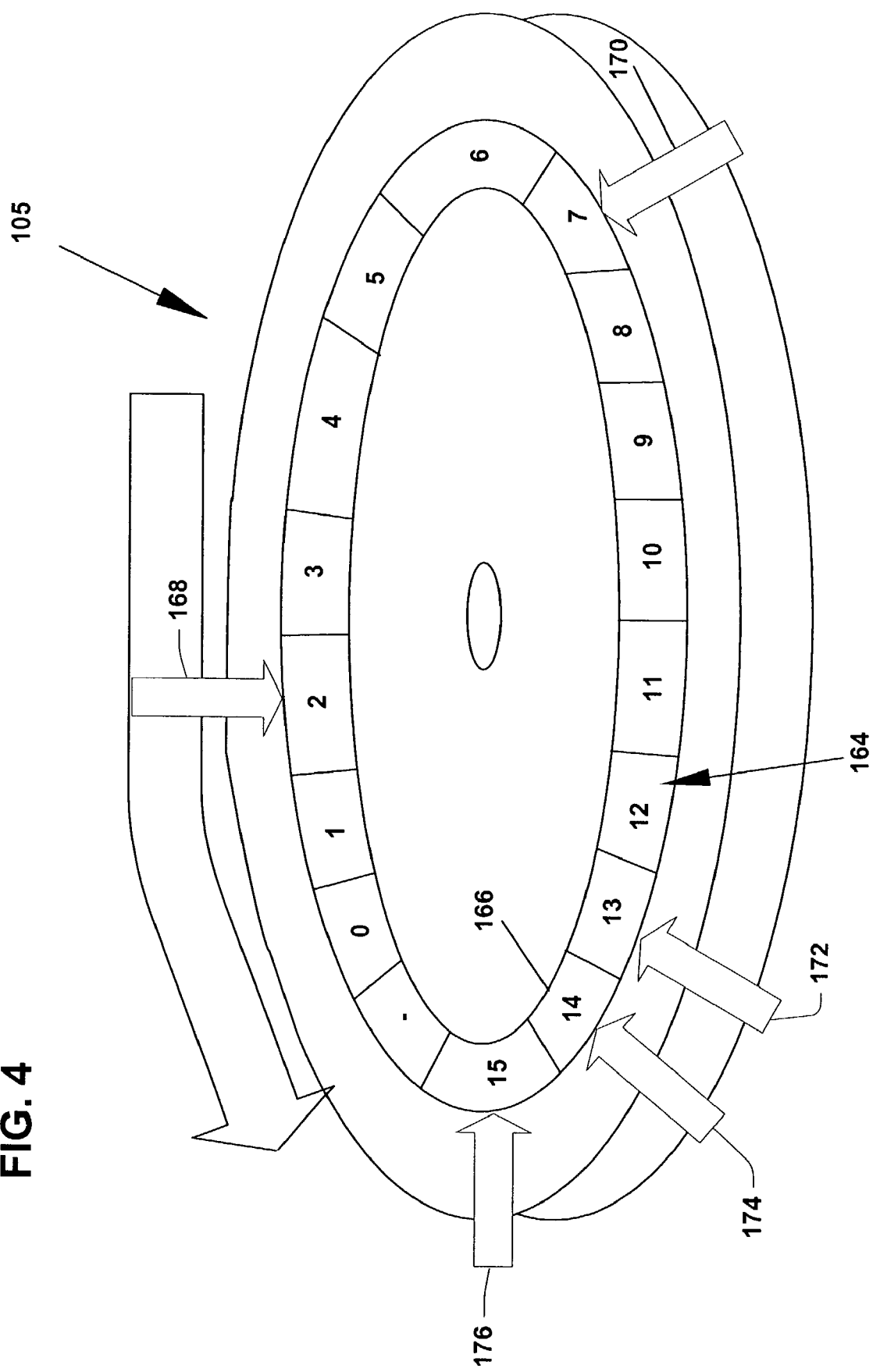
FIG. 4 is an illustration of a plurality of sectors in a data track on a disc.

FIG. 4 illustrates disc 105 having a plurality of sectors 164 along data track 166. During the write operation, write fault unit 136 identified errors to sectors 2 and 7, illustrated by arrows 168 and 170. Furthermore, off-track calculation unit 138 identified errors in sectors 13, 14 and 15. These error sectors are represented by arrows 172, 174 and 176, respectively.

Figure 5:
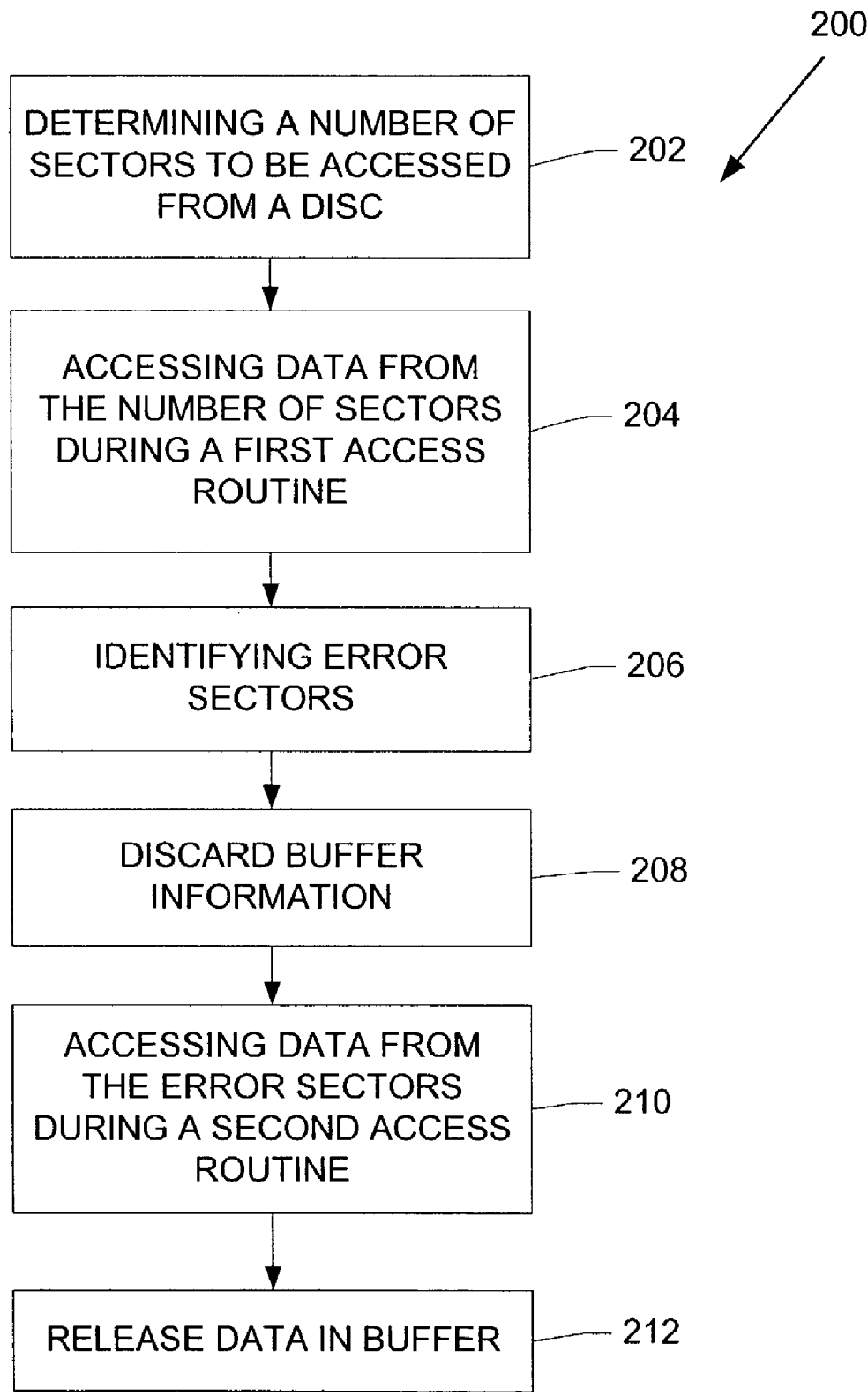
FIG. 5 is a flow chart illustrating a method of error handling according to one embodiment of the present invention.

FIG. 5 illustrates a method 200 for handling errors according to one embodiment of the present invention. Reference is made to the examples illustrated in FIGS. 3 and 4. Method 200 begins with step 202 where a number of sectors to be accessed from a disc is determined. For example, it is determined that sectors 0–16 will be written to disc 105. As appreciated by those skilled in the art, the number of sectors to be accessed may be from a single track or span multiple tracks on the disc. Next, at step 204, data is written to the number of sectors during a first access routine such as a disc revolution. Next, at step 206, error sectors are identified. During this step, write fault unit 136 and/or off-track calculation unit 138 identify error sectors while writing data to or reading data from disc 105. At step 208, buffer information may be discarded. For example, information correctly written to disc 105 before error sectors were encountered can be discarded. During a second access routine, the error sectors are written at step 210. In the above example, data from only the error sectors is rewritten to disc 105. After the error sectors have been written to disc 105, extra data within the buffer unit 134 can be released at step 212. The data can be released as soon as disc controller 129 has written all of the error sectors to disc 105.

Figure 6:
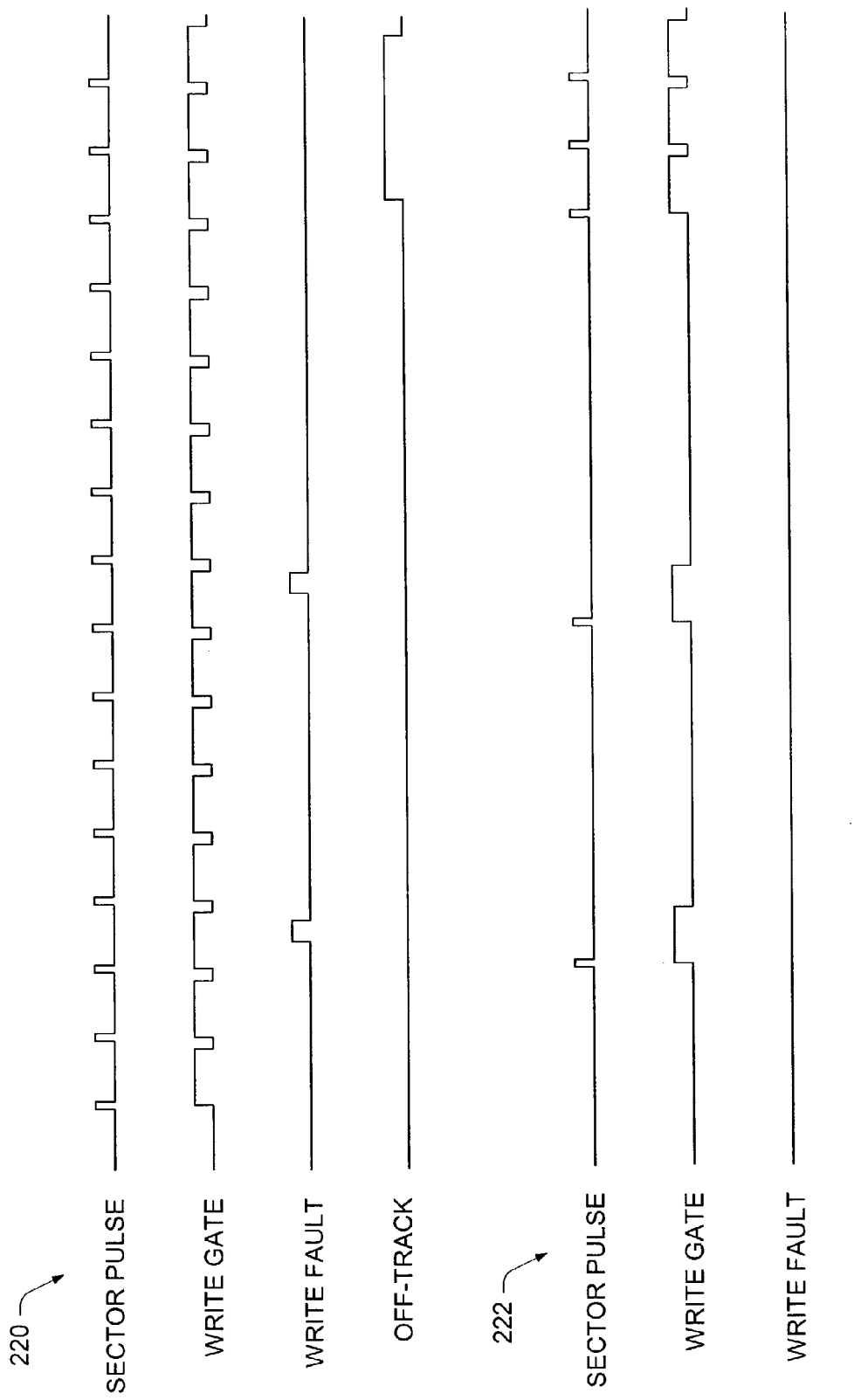
FIG. 6 is a timing diagram for a first access routine and a timing diagram for a second access routine.

FIG. 6 illustrates a timing diagram 220 for the first access routine and a timing diagram 222 for the second access routine described above. Each of the timing diagrams include a sector pulse signal, a write gate signal, a write fault signal and an off-track signal. The sector pulse signal indicates that the particular sector should be accessed. The write gate signal indicates that data is written. The write fault and off-track signals indicate if write faults and off-track errors are encountered. As illustrated in timing diagram 220, write fault signals are received while writing to sectors 2 and 7. Furthermore, off-track errors are received while writing to sectors 13 through 15. During the second access routine, as illustrated by timing diagram 222, the sector pulse and write gate signals are generated for sectors 2, 7, 13, 14 and 15. Accordingly, these sectors are the only ones written during a second access routine.

Figure 7:
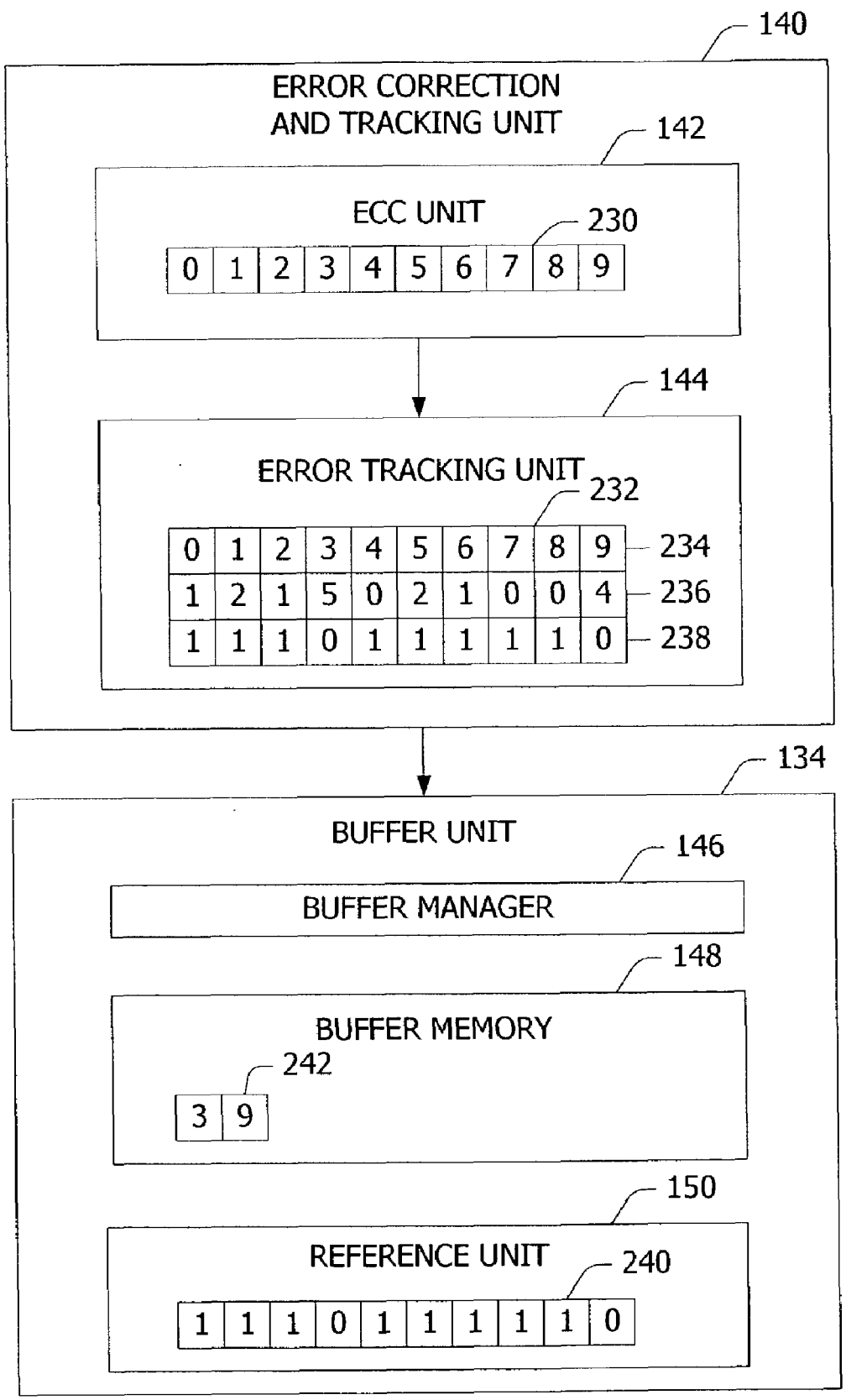
FIG. 7 is a block diagram of an error correction and tracking unit and a buffer unit.

FIG. 7 illustrates an exemplary embodiment for operation of error correction and tracking unit 140 and buffer unit 134 during a read operation. Data unit 230 has been read into ECC unit 142 to determine if any errors exist. In this example, data unit 230 includes ten sectors (numbered 0–9). Error tracking unit 144 tracks the errors detected and/or corrected by ECC unit 142 and develops table 232 containing information pertinent to tracking the errors. Error tracking unit 144 tracks errors that correspond to symbols that are incorrect, known as "symbol errors", although error tracking unit 144 can track other errors such as bit errors. A symbol can be a word, byte, sector, 8-bit segment, 10-bit segment or any other unit of data.

Table 232 includes rows 234, 236 and 238. Row 234 corresponds to an identifier of each data sector in data unit 230. Row 236 includes the number of symbol errors that occur in each of the sectors of data unit 230. Error tracking unit 144 can also provide a signal of whether a particular sector is an error sector or not. In this example, a threshold of three symbol errors per sector is used to determine whether a particular sector is an error sector or not and stores the signal in row 238. The threshold value is programmable and can be stored in internal circuitry 128 (FIG. 1).

Those skilled in the art will recognize that a maximum error correction level can be used that is independent of the threshold level. For example, an ECC unit may have a maximum correction level of five errors per sector. In contrast, the threshold level can be three symbol errors per sector. In current systems, a lower error correction level would be set to reduce growth errors. If a sector was encountered above the error correction level, a retry routine would be used, even though the error is correctable, to prevent growth errors.

With embodiments of the present invention, the maximum error correction level can be used continuously since the threshold level is in place to rewrite error sectors. Even though a particular sector has more errors than the threshold, the sector can be corrected and sent to host 101. Row 238 is generated based upon a comparison between the number of errors for each sector, which is contained in row 236, and the threshold. As illustrated, sectors 3 and 9 have a number of errors above the threshold and thus a '0' bit is generated in row 238. Sectors 0–2 and 4–8 have a number of errors less than the threshold and thus a '1' bit is generated in row 238.

Row 238 thus contains logic signals or flags that indicate whether particular sectors are error sectors. Row 238 is referred to as a "skip mask".

Skip mask 238 is then stored in reference unit 150 of buffer unit 134 for use by disc controller 129 (FIG. 2) to determine which sectors are to be read and re-written during subsequent disc revolutions. For example, during a next disc revolution, data from only sectors 3 and 9 (error sectors) are read into buffer memory 142 as a data unit 242. After data unit 242 has been corrected using ECC unit 142, corrected data unit 242 is written to the disc using skip mask 238 in a next disc revolution.

Figure 8:
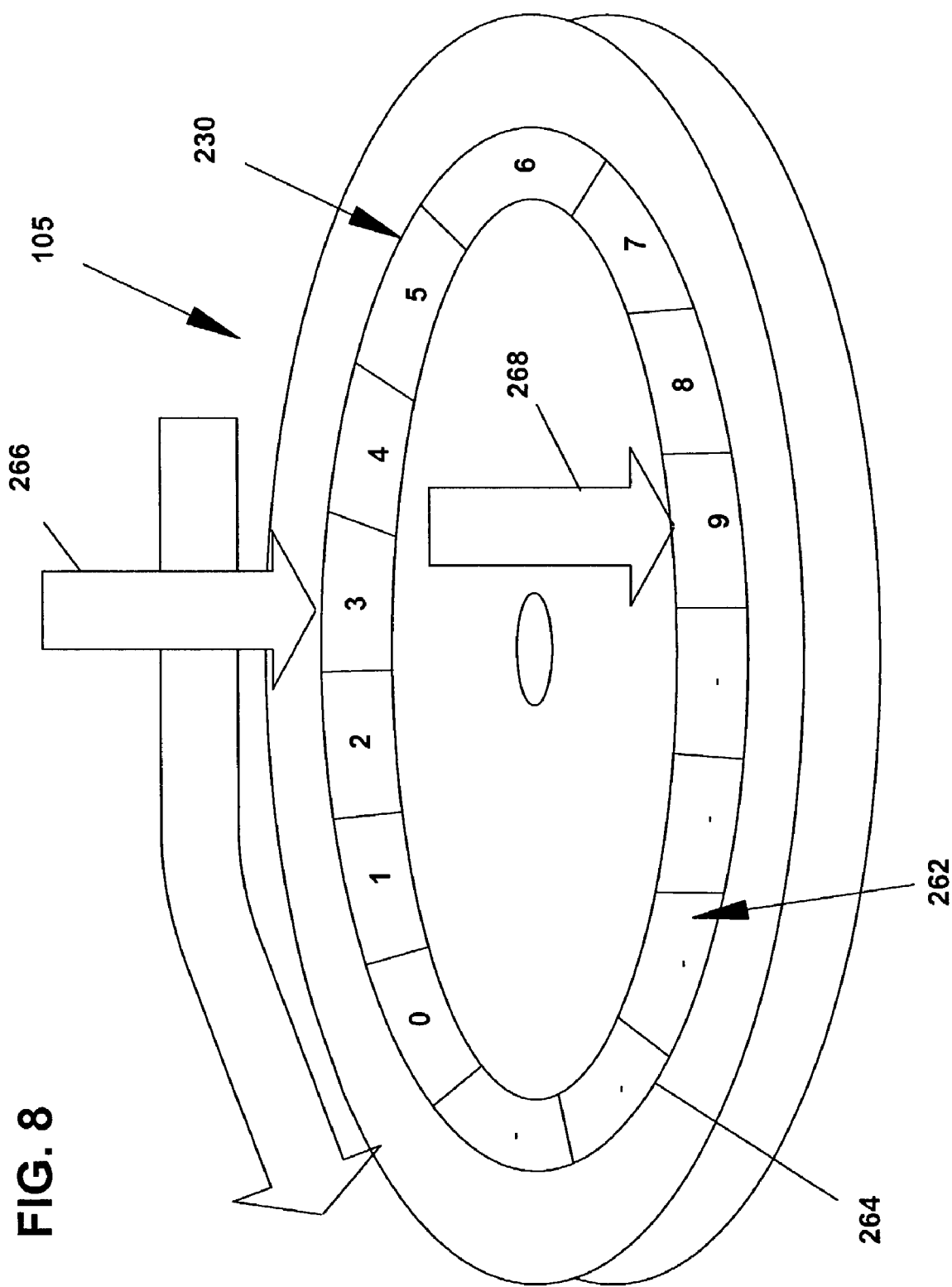
FIG. 8 is an illustration of a plurality of sectors in a data track on a disc.

FIG. 8 illustrates disc 105 having a plurality of sectors 262 along data track 264. As illustrated, data unit 220 includes sectors 0–9 of the plurality of sectors 262 along data track 264. Arrows 266 and 268 point to error sectors 3 and 9, respectively.

FIG. 9 illustrates a flowchart of a method of correcting read errors in accordance with an embodiment of the present invention. For illustrative purposes, method 400 is described with reference to elements previously discussed having similar reference numerals. First, a number of sectors to be read is determined by disc controller 129 in step 402. At step 404 data is read from all sectors of the number of sectors during a first disc revolution. During this step, disc controller 129 reads data from all of the number of sectors on disc 105 according to a command from host system 101.

During step 406, error tracking unit 144 identifies error sectors having a number of errors above a predetermined threshold. This identification can be stored in skip mask 238, for example. Using the signals from skip mask 238, data is read from only the error sectors during a second disc revolution, in step 408. Alternatively, data from the error sectors can be maintained in buffer memory 148, without the need for step 408. If data from the error sectors is not maintained in buffer memory 148, the data can be read during a revolution during another time, for example during drive idle time. After data from the error sectors is read, ECC unit 142 corrects the data from the error sectors in buffer memory 148 using buffer manager 146 during step 410. After the data is corrected, buffer unit 134, again using skip mask 238, writes data to the error sectors on the disc during a third disc revolution in step 412.

In summary, one embodiment of the present invention is directed to a method (200, 400) for handling data errors in a system. The method includes determining (202, 402) a number of sectors to be accessed. Also, all sectors from the number of sectors are accessed (204, 404) during a first access routine. Next, error sectors are identified (206, 406) and the error sectors are accessed (210, 408, 412) during a second access routine.

Another embodiment of the present invention relates to a data storage system. The system (100) includes a storage medium (105), a head configured to access data from the storage medium (105), a buffer memory (148) and a controller (129). The controller (129) is configured to determine a number of sectors to be accessed from the storage medium and access all sectors of the number of sectors on the storage medium during a first routine. Furthermore, the controller (129) is configured to identify error sectors from the number of sectors and access the error sectors during a second routine.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to an error handling system for a disc drive, it will be appreciated by those skilled in the art that the teachings of the present invention can be applied to other error handling systems, without departing from the scope and spirit of the present invention.

What is claimed is:

1. A method of handling errors in a system comprising:
   determining a number of data portions to be accessed;
   accessing all data portions of the number of data portions during a first access routine;
   identifying error data portions in the number of data portions; and
   writing the error data portions during a second access routine as a function of identifying the error data portions.

2. The method of claim 1 wherein identifying includes associating a write fault error with a particular data portion.

3. The method of claim 1 wherein identifying includes identifying error data portions based on positioning information.

4. The method of claim 1 wherein the positioning information pertains to a position of a head relative to a track that is accessed.

5. The method of claim 1 and further comprising providing a signal for each data portion indicative of whether each data portion is an error data portion and generating a mask based on the signals.

6. The method of claim 5 wherein accessing the error data portions comprises writing only the error data portions based on the mask.

7. The method of claim 5 and further comprising storing the mask in a buffer.

8. The method of claim 1 wherein accessing all data portions comprises writing data to all data portions of the number of data portions and wherein the method further comprises storing data to be written to a storage medium in a buffer and releasing at least a portion of the data stored in the buffer that has correctly been written to the storage medium during the first access routine, wherein releasing is performed before the second access routine.

9. The method of claim 1 wherein accessing the error data portions includes writing only the error data portions during a second access routine.

10. The method of claim 1 wherein identifying includes:
    associating write fault errors with particular data portions and generating error signals indicative thereof;
    identifying error data portions based on positioning information and generating error signals indicative thereof;
    generating an error signal for each sector indicative of whether each sector is an error sector;
    generating a mask based on the error signals; and
    writing data to error data portions based on the mask.

11. A data storage system, comprising:
    a storage medium; and
    a controller configured to determine a number of data portions to be accessed from the storage medium, access all data portions of the number of data portions on the storage medium during a first routine, identify error data portions from the number of data portions, and write the error data portions during a second routine as a function of the identified error data portions.

12. The system of claim 11 wherein the controller is further configured to associate a write fault error with a particular data portion.

13. The system of claim 11 wherein the controller is further configured to identify error data portions based on positioning information.

14. The system of claim 13 wherein the positioning information pertains to a position of a head relative to a track that is accessed.

15. The system of claim 11 wherein the controller is further configured to provide a signal for each data portion indicative of whether each data portion is an error data portion and generate a mask based on the signals.

16. The system of claim 15 wherein the controller is further configured to only write the error data portions based on the mask.

17. The system of claim 15 wherein the controller is further configured to store the mask in the buffer memory.

18. The system of claim 11 wherein the controller is further configured to store data to be accessed in the buffer memory and release at least a portion of the data stored in the buffer memory when data has correctly been written to the storage medium.

19. The system of claim 11 wherein the controller is further configured to write only the error data portions during the second access routine.

20. The system of claim 11 wherein the controller is further configured to associate write fault errors with particular data portions and generate error signals indicative thereof, identify error data portions based on information and generate error signals indicative thereof, generate a mask based on the error signals and write data to the error data portions based on the mask.

21. A system, comprising:
    a storage medium;
    a buffer memory; and
    a controller configured to determine a number of data portions to be accessed from the storage medium, store data in the buffer memory corresponding to the number of data portions to be accessed, access all data portions of the number of data portions on the storage medium during a first routine, identify error data portions from the number of data portions, store a mask in the buffer memory as a function of identified error portions, access the error data portions during a second routine and release at least a portion of the data stored in the buffer memory when data on the storage medium has been correctly accessed.

22. The system of claim 21 wherein the controller is further configured to associate write fault errors with particular data portions and generate error signals indicative thereof, identify error data portions based on positioning information and generate error signals indicative thereof, generate a mask based on the error signals and write data to the error data portions based on the mask.

23. The system of claim 21 wherein the controller is further configured to associate a write fault error with a particular data portion.

24. The system of claim 21 wherein the controller is further configured to identify error data portions based on positioning information.

* * * * *